United States Patent [19]

Harrison, Sr.

[11] Patent Number: 4,603,500
[45] Date of Patent: Aug. 5, 1986

[54] FISHING POLE HOLDER

[76] Inventor: James A. Harrison, Sr., Rte. 1, Box 757-J, Bartow, Fla. 33830

[21] Appl. No.: 665,731

[22] Filed: Oct. 26, 1984

[51] Int. Cl.$^4$ ............................................ A01K 97/10
[52] U.S. Cl. .................... 43/21.2; 248/514; 248/538
[58] Field of Search ............... 43/21.2; 248/535, 538, 248/514, 515, 511, 512, 520, 524, 525, 539

[56] References Cited

U.S. PATENT DOCUMENTS

| | | | |
|---|---|---|---|
| 2,694,538 | 11/1954 | Consolo | 248/535 |
| 3,612,454 | 10/1971 | Linn | 248/515 |
| 3,667,708 | 6/1972 | Smeltzer | 248/512 |
| 3,691,668 | 9/1972 | Strebig | 43/19.2 |
| 4,176,819 | 12/1979 | Lowe | 248/520 |
| 4,495,721 | 1/1985 | Emory | 43/21.2 |
| 4,527,349 | 7/1985 | Emory | 43/21.2 |

*Primary Examiner*—Gene P. Crosby

[57] ABSTRACT

A fishing pole holder comprises an articulated support and three adjustable elongate pole pins pivotally mounted in upright angularly spaced positions on the support each for receipt in an elongate blind bore formed in a fishing pole from its butt end, so as to support the poles in angularly displaced positions. The pins can be pivoted to adjust the vertical orientation of the poles, and the holder can be attached on any suitable support surface such as the rail or transom of a fishing boat.

9 Claims, 4 Drawing Figures

FISHING POLE HOLDER

BACKGROUND OF THE INVENTION

This invention relates to a holder for use on a fishing boat or the like, for holding one or more fishing poles in secure fashion during fishing, while awaiting a strike. The holder may be in the form of an attachment which may, for example, be secured to the rail or transom of a fishing boat to support the or each pole in a secure yet readily adjustable manner relieving the fisherman of the burden of holding the pole or poles.

STATEMENT OF PRIOR ART

Applicant is aware of the following U.S. Pat. Nos. showing fishing rod holders and the like. None of these, however, discloses the features of the present invention.

2,196,472
2,612,334
3,667,708
3,564,758
4,375,731
3,783,547
3,964,706

SUMMARY OF THE INVENTION

Among objects of the invention are one or more of the following, namely; the provision of a fishing pole holder which is simple and economical to manufacture from readily available rust-proof materials, which is simple to install, use and adjust, while being durable and reliable in operation, which can be adapted for use in diverse locations, and which does not require any special attachments on a fishing pole with which it is to be used.

In accordance with the invention, a remarkably simple and effective fishing pole holder, particularly for cane or bamboo fishing poles, but also suitable for other types of rods, comprises an elongate pin adapted to fit in a blind longitudinal bore formed in the fishing pole from its butt end, and support means for retaining the pin in upright position. The holder may, for example, include a mounting attachment for a plurality of the pole pins, each of which may conveniently be fabricated from standard bolts with the boltheads removed, the bolts being bent at right angles adjacent their threaded ends, and the threaded ends used to secure the bolts to the support means, with releasable locknuts allowing the angle of the bolts to be adjusted. The support means, which may be fabricated from metal bar, may comprise a central riser for attachment to a fishing boat rail or the like, and a cross-bar pivotally connected to the riser by means of an adjustable locknut, with one pole pin being pivotally secured at one end of the cross-bar, and a pair of pole pins being secured to pivotal brackets attached to the other end of the cross-bar by an adjustable locknut, with the brackets projecting transversely on opposite sides of the cross-bar. This arrangement allows the angle of each pole pin to be adjusted independently and provides for the mounting of three fishing poles in positions for precluding snagging of the respective fishing lines.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
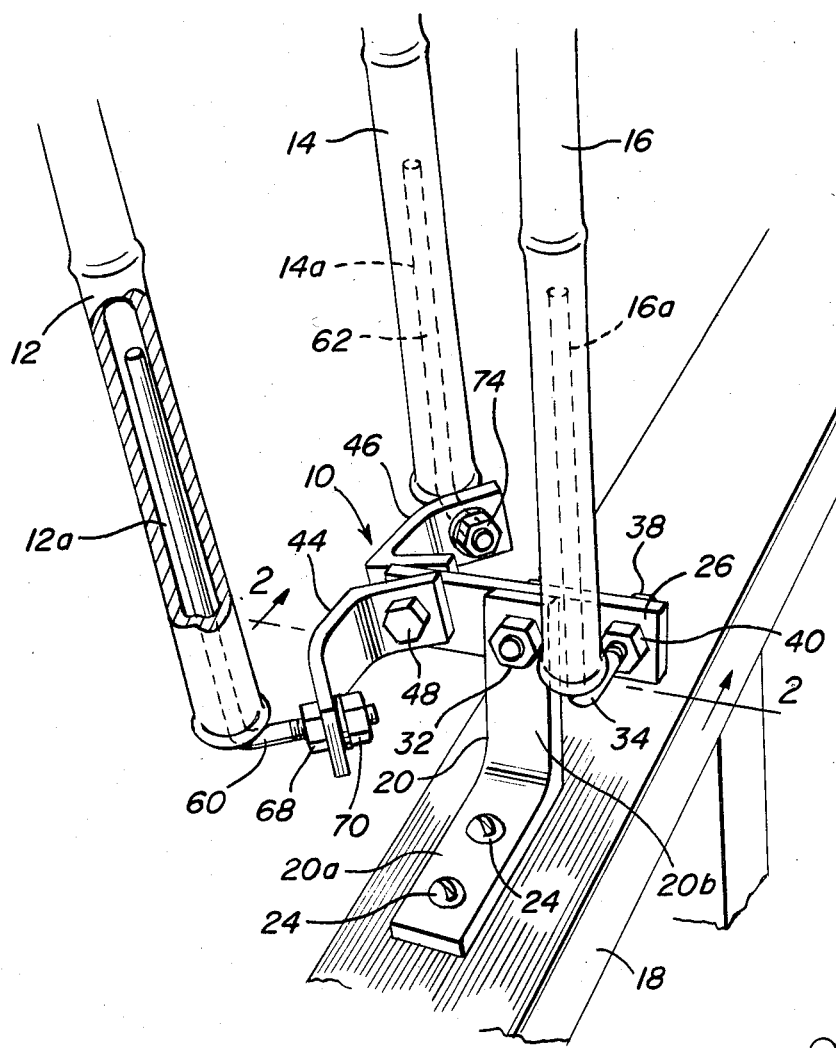
FIG. 1 is a perspective view of a fishing pole holder in accordance with the invention, with fishing poles attached.
Figure 2:
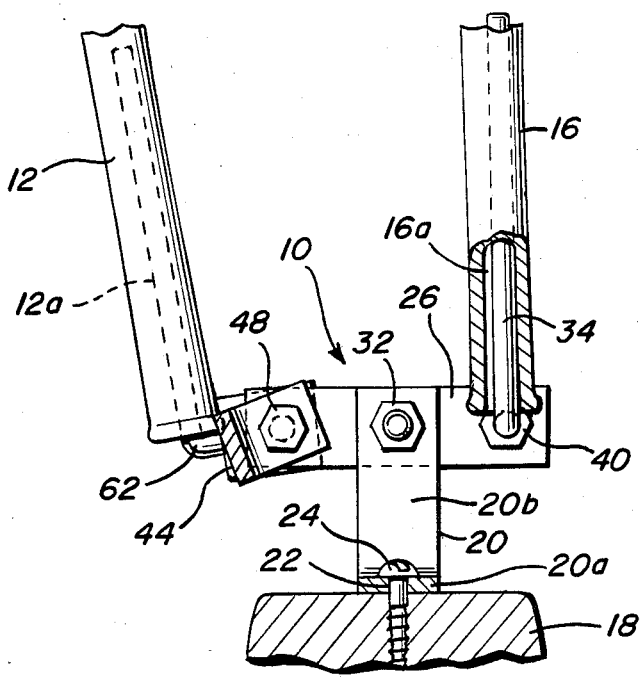
FIG. 2 is a sectional view on line 2—2 of FIG. 1.
Figure 3:
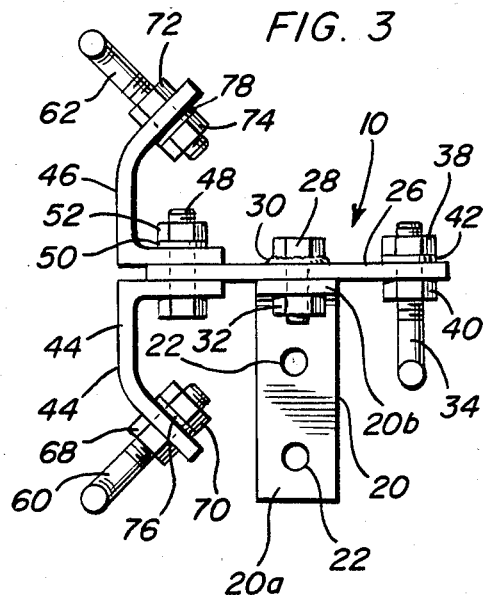
FIG. 3 is a plan view of the holder.

A fishing pole holder 10 in accordance with the invention is shown in FIGS. 1 and 2 holding three cane or bamboo fishing poles 12, 14, 16 in upright positions with the holder secured on a rail 18 of a fishing boat or the like.

Holder 10 includes an angled riser 20, having holes 22 in its base 20a for screws 24 attaching same to the rail, and a hole (not shown) in its upright portion 20b for the pivotal attachment of a cross-bar 26 by means of a cap screw 28, which may be spot-welded to the cross-bar at 30, and a locknut 32. The riser and cross-bar may both be fabricated from $\frac{1}{8}'' \times \frac{3}{4}''$ stainless flat bar, the riser being about two inches in height with a two inch long base and the cross-bar about three inches in length.

At one end of cross-bar 26 there is mounted a first pole pin 34 which may comprise a five inch long 5/16" diameter rust-proof bolt with the head removed, the bolt being bent substantially at a right angle adjacent its threaded end. The bolt is inserted in a suitable opening (not shown) in the cross-bar, and adjustably secured by means of locknuts 38, 40 and a lock washer 42 allowing the angle of the pin to be adjusted.

Figure 4:
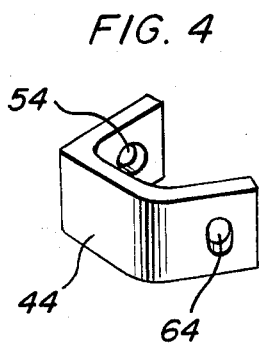
FIG. 4 is a perspective view of a pole pin bracket.

At the other end of cross-bar 26 are mounted a pair of outwardly projecting substantially C-shaped pole pin brackets 44, 46 which may also be bent to shape from a three inch length of the flat bar, with 90° and 45° bends, the brackets being pivotally attached to the cross-bar by a common bolt 48, lock washer 50, a locknut 52 extending through holes (as 54 in FIG. 4) in the respective brackets and a hole (not shown) in the cross-bar. At the outer ends of the respective brackets are pivotally mounted second and third pole pins 60, 62 of like construction to pole pin 34, pins 60, 62 extending through respective openings (as 64, FIG. 4) in the brackets and being adjustably secured by locknuts 68, 70 and 72, 74 with interposed lock washers 76, 78.

For mounting poles 12, 14, 16 on the respective pole pins, the poles are formed with blind bores 12a, 14a, 16a from their respective butt ends, the bores, for example, being about $\frac{3}{8}''$ diameter for the 5/16" diameter pole pins.

The holder is effective to hold the poles securely in position when the respective pole pins are tightened in place. The pins can be adjusted for angle individually about the axes of their respective threaded ends, for example to adjust the height of the outer ends of the fishing poles above the water, and pins 60, 62 can also be adjusted by adjusting the position of brackets 44, 46. Another degree of adjustment is provided by pivotally adjusting the position of cross-bar 26 on riser 20. The fishing poles can thus be readily set in positions suited to a particular situation, and are securely held in place during fishing. The angular displacement of the pole pins about riser 20 aids in preventing fishing lines from the respective poles from becoming snagged. The holder can be readily installed, removed and dismantled. The individual pole pins can be removed when not in use to prevent theft.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fishing pole holder comprising a plurality of elongate pole pins for receipt in corresponding longitudinally extending bores formed from the butt ends of respective fishing poles, and articulated support means for mounting the pins in upright angularly adjustable positions on a suitable support such as the rail of a fishing boat or the like, wherein each pole pin has an elongate portion for receipt in a respective bore, a base portion bent at an angle to the elongate portion, and means for securing the base portion to the support means for angular adjustment of the respective pin about the axes of the base portion, wherein the support means comprises a bar, means for supporting the bar in substantially horizontal position, means for pivotally securing the elongate portion of a first pole pin at one end of the bar, a pair of transversely extending brackets at the other end of the bar, and means for pivotally securing the elongate portions of second and third pole pins to the respective brackets.

2. The invention of claim 1 wherein the brackets are substantially C-shaped having one end pivotally secured to the bar and the other end mounting the respective pole pin.

3. The invention of claim 2 wherein the brackets are mounted on the bar by a common pivotal connection allowing independent pivotal adjustment of the respective brackets.

4. The invention of claim 1 wherein the bar is secured for pivotal adjustment on a support member intermediate the ends of the bar.

5. A fishing pole holder comprising a riser for securement on the rail of a fishing boat or the like, a plurality of elongate pole pins for receipt in respective longitudinally extending bores formed in fishing poles from the butt ends thereof, and support means carried on the riser for supporting the pins in upright positions angularly displaced in relation to the riser, the holder including securement means for securing the respective pole pins on the support means for angular adjustment of the respective pins, wherein each pole pin has an elongate portion for receipt in the respective bore and a base portion angled with respect to the elongate portion, and wherein the securement means secures each pin to the support means for angular adjustment of the pin about the axis of the respective base portion and for angular adjustment of the pin about a further horizontal axis spaced from the base portion axis.

6. The invention of claim 5 wherein the support means comprises a cross-bar pivotally mounted on the riser for supporting a first pole pin at one end thereof, and a pair of opposed transversely extending brackets pivotally mounted at the other end of the bar about respective horizontal axes for suporting second and third pole pins.

7. A fishing pole holder comprising a riser for securement on the rail of a fishing boat and the like, a cross-bar mounted on the riser, a first elongate pole pin, means mounting the pole pin at one end of the cross-bar in upright position for receipt in an elongate bore in the butt end of a first fishing pole, a pair of opposed transversely extending brackets at the other end of the bar, second and third pole pins, and means securing the second and third pole pins in upright position to the respective brackets for receipt in elongate bores in respective second and third fishing poles.

8. The invention of claim 7 wherein respective pole pins are mounted on the cross-bar and brackets for pivotal movement about horizontal axes.

9. The invention of claim 8 wherein the cross-bar is pivotally mounted on the riser and the brackets are pivotally mounted on the cross-bar.

* * * * *